United States Patent [19]

Kudo et al.

[11] Patent Number: 4,810,074
[45] Date of Patent: Mar. 7, 1989

[54] PHOTOGRAPHIC LENS SYSTEM

[75] Inventors: Yoshinobu Kudo; Akira Fukushima, both of Osaka, Japan

[73] Assignee: Minolta Camera Kabushiki Kaisha, Osaka, Japan

[21] Appl. No.: 187,378

[22] Filed: Apr. 28, 1988

[30] Foreign Application Priority Data

Apr. 28, 1987 [JP] Japan ................................ 62-105953
Jul. 7, 1987 [JP] Japan ................................ 62-170651

[51] Int. Cl.$^4$ .......................... G02B 13/18; G02B 9/34
[52] U.S. Cl. ..................................... 350/432; 350/469
[58] Field of Search ............... 350/432, 433, 434, 435, 350/469

[56] References Cited

U.S. PATENT DOCUMENTS

| | | | |
|---|---|---|---|
| 1,168,873 | 1/1916 | Florian | 350/469 |
| 2,446,402 | 8/1948 | Aklin | 350/469 |
| 3,028,793 | 11/1957 | Bousky et al. | 350/432 |
| 4,368,956 | 1/1983 | Yamada et al. | 350/432 |
| 4,373,786 | 2/1983 | Yamada | 350/432 |
| 4,413,888 | 11/1983 | Sato | 350/432 |
| 4,443,069 | 4/1984 | Mihara | 350/432 X |
| 4,456,345 | 6/1984 | Fujibayashi | 350/432 X |
| 4,477,155 | 10/1984 | Sato et al. | 350/432 X |
| 4,521,084 | 6/1985 | Kurihara | 350/432 |
| 4,596,447 | 6/1986 | Yamada et al. | 350/432 X |
| 4,606,607 | 8/1986 | Kurihara | 350/469 X |
| 4,695,134 | 9/1987 | Nakayama et al. | 350/469 X |

FOREIGN PATENT DOCUMENTS

| | | |
|---|---|---|
| 40-20344 | 9/1965 | Japan . |
| 56-50248 | 11/1981 | Japan . |
| 60-121413 | 6/1985 | Japan . |
| 61-37829 | 2/1986 | Japan . |
| 61-9607 | 3/1986 | Japan . |

Primary Examiner—John K. Corbin
Assistant Examiner—Scott J. Sugarman
Attorney, Agent, or Firm—Price, Gess & Ubell

[57] ABSTRACT

The present invention provides a photographic lens system comprising from the object side to the image side; a first lens element of a positive meniscus lens convex to the object side; a second lens element of a bi-concave lens; a third lens element of a bi-convex lens; a fourth lens element of a negative meniscus lens concave to the object side; and an aperture diaphragm; wherein the lens system fulfills the following conditions:

$$0.4 < -f_A/f < 0.9$$

$$0.004 < d_6/(D+t) < 0.1$$

$$-1.0 < (r_7 - r_8)/(r_7 + r_8) < -0.35$$

wherein: $f_A$ represents focal length of an air lens formed by the image side surface of the first lens element and the object side surface of the second lens element; f represents focal length of the whole lens system; $d_6$ represents axial distance between the image side surface of the third lens element and the object side surface of the fourth lens element; D represents axial distance from the object side surface of the first lens element to the image side surface of the fourth lens element; t represents axial distance from the image side surface of the fourth lens element to the aperture diaphragm in the infinity focusing condition, measured towards the image side; $r_7$ represents paraxial radius of curvature of the object side surface of the fourth lens element; and $r_8$ represents paraxial radius of curvature of the image side surface of the fourth lens element.

17 Claims, 6 Drawing Sheets

-1.0   1.0
Spherical
Aberration
Sine Condition

-1.0   1.0
Astigmatism

-2.0   2.0
Distortion (%)

F2.90
— d
---- SC
Spherical Aberration
Sine Condition

FIG.9b

ω=28.7°
---- DM
— DS
Astigmatism

FIG.9c

ω=28.7°
Distortion (%)

FIG.10a

F2.90
— d
---- SC
Spherical Aberration
Sine Condition

FIG.10b

ω=28.7°
---- DM
— DS
Astigmatism

FIG.10c

ω=28.7°
Distortion (%)

FIG.11a

Spherical Aberration
Sine Condition

FIG.11b

Astigmatism

FIG.11c

Distortion (%)

FIG.12a

Spherical Aberration
Sine Condition

FIG.12b

Astigmatism

FIG.12c

Distortion (%)

PHOTOGRAPHIC LENS SYSTEM

BACKGROUND OF THE INVENTION

1. Field of the Invention

The present invention relates to a photographic lens system, and more particularly to a photographic lens system having an aperture diaphragm behind all of the lens elements.

2. Description of the Prior Art

Recently, the compactness of the lens system has become a requirement in lens shutter cameras. However, it is difficult to make the lens system more compact, since the lens system is also required to achieve a large angle of view reaching about 60°. Two types of such lens system are proposed, one of which has an aperture diaphragm between the successive two lens elements, and another of which has an aperture diaphragm behind all of the lens elements. The former type has a disadvantage in that it is difficult to correct all of the aberrations well in various object distances if one or plurality of the lens elements located at the object side of the aperture diaphragm are shifted in the focusing operation, since the change of the aberrations is excessively large in the focusing operation.

On the other hand, the latter type also has a disadvantage in that it is difficult to make the lens system compact. The disadvantage is caused by the difficultyof correcting the distortion well while maintaining good correction of the field curvature. Namely, in order to make the lens system more compact it is necessary to apply a telephoto type power arrangement in which a positive refractive power is located at the object side and a negative refractive power is located at the image side thereof. Thus, the positive refractive power located at the object side should be increased for making the lens system more compact, while the resulting positive distortion and the deterioration of the field curvature is corrected by the decrease of Petzval sum. Here, the deterioration of the coma aberration generally results even if both the distortion and the field curvature are well corrected.

SUMMARY OF THE INVENTION

An object of the present invention is to provide a photographic lens system of the behind aperture diaphragm type in which the compactness of the lens system is improved with good correctiion of the aberrations and with a larger aperture ratio reaching F/2.60–2.90.

Another object of the present invention is to provide a photographic lens system of the behind aperture diaphragm type suitable for a compact lens shutter camera.

To achieve the above described objects, the present invention provides a photographic lens system comprising from the object side to the image side: a first lens element of a positive meniscus lens convex to the object side; a second lens element of a bi-concave lens; a third lens element of a bi-convex lens; a fourth lens element of a negative meniscus lens concave to the object side; and an aperture diaphragm; wherein the lens system fulfills the following conditions:

$$0.4 < -f_4/f < 0.9$$

$$0.004 < d_6/(D+t) < 0.1$$

$$-1.0 < (r_7 - r_8)/(r_7 + r_8) < -0.35$$

wherein: $f_4$ represents focal length of an air lens formed by the image side surface of the lens element and the object side surface of the second lens element; f represents focal length of the whole lens system; $d_6$ represents axial distance between the image side surface of the third lens element and the object side surface of the fourth lens element; D represents axial distance from the object side surface of the first lens element to the image side surface of the fourth lens element; t represents axial distance from the image side surface of the fourth lens element to the aperture diaphragm in the infinity focusing condition, measured towards the image side; $r_7$ represents paraxial radius of curvature of the object side surface of the fourth lens element; and $r_8$ represents paraxial radius of curvature of the image side surface of the fourth lens element.

DETAILED DESCRIPTION OF THE PREFERRED EMBODIMENTS

The following description is provided to enable any person skilled in the optical and camera field to make and use the invention and sets forth the best modes contemplated by the inventors for carrying out their invention. Various modification, however, will remain readily apparent to those skilled in the art, since the generic principles of the present invention have been defined herein specifically to provide a relatively economical and easily manufactured compact wide angle lens system. The deviation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm lens shutter camera. In the drawings, the schematic cross sectional view discloses the position of the lens elements in the infinity focusing condition.

Figure 1:
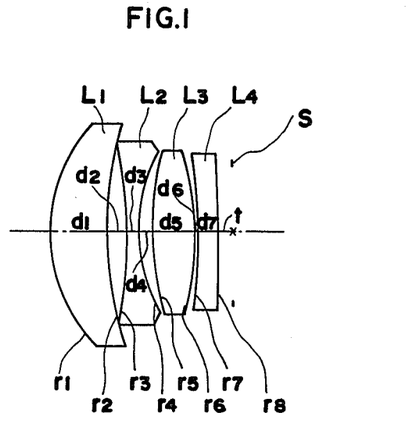
FIG. 1 represents a cross sectional view of a first to eleventh embodiment according to the present invention.
Figure 2A:
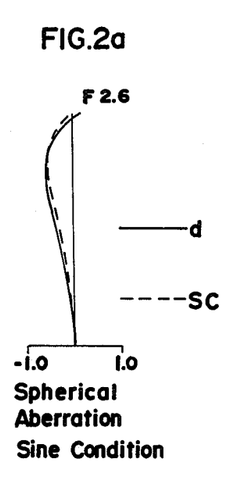
FIGS. 2a to 2c represent the aberration curves of the first embodiment.
Figure 2B:
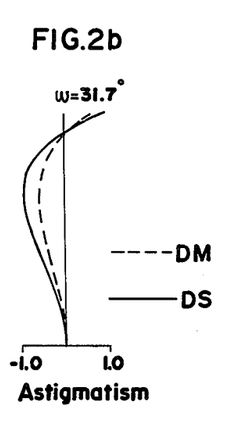
Figure 2C:
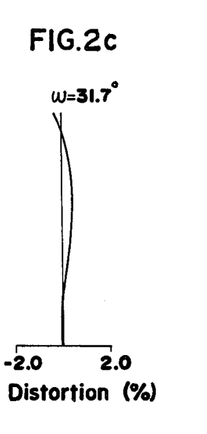
Figure 3A:
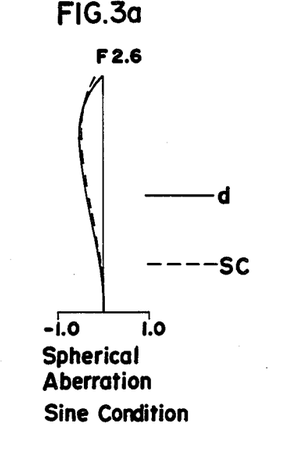
FIGS. 3a to 3c represent the aberration curves of the second embodiment.
Figure 3B:
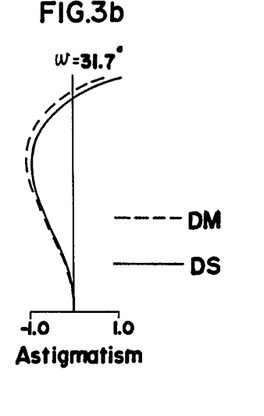
Figure 3C:
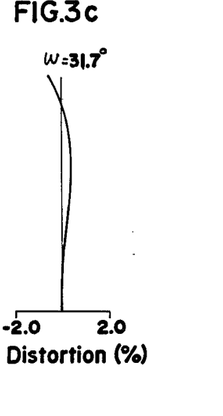
Figure 4A:
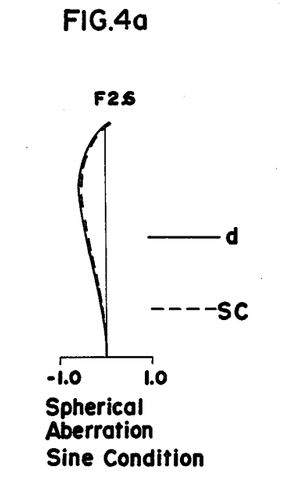
FIGS. 4a to 4c represent the aberration curves of the third embodiment.
Figure 4B:
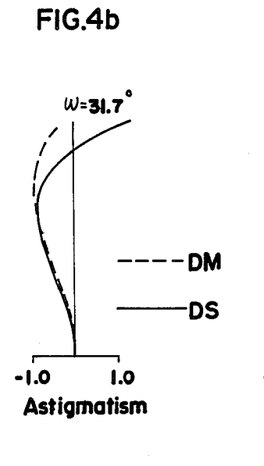
Figure 4C:
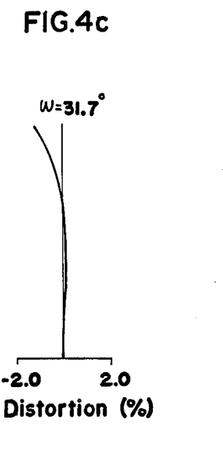
Figure 5A:
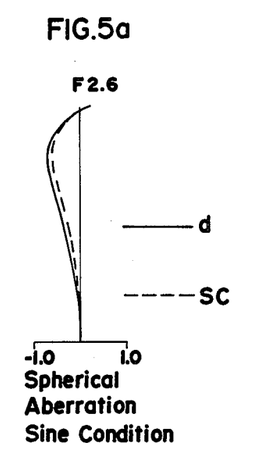
FIGS. 5a to 5c represent the aberration curves of the fourth embodiment.
Figure 5B:
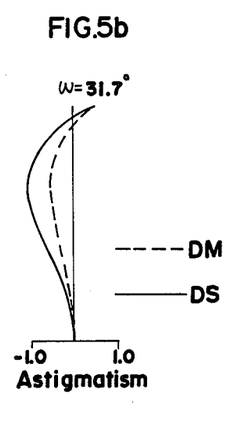
Figure 5C:
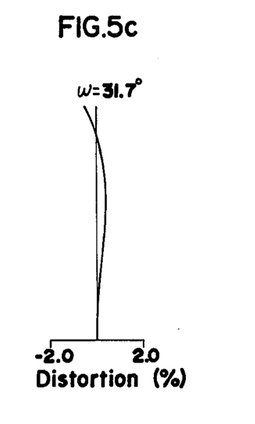
Figure 6A:
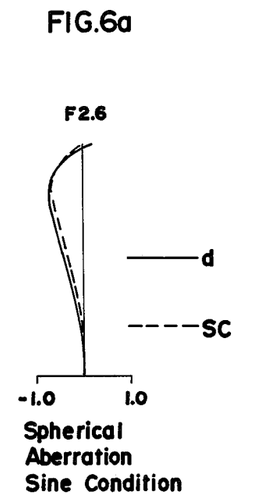
FIGS. 6a to 6c represent the aberration curves of the fifth embodiment.
Figure 6B:
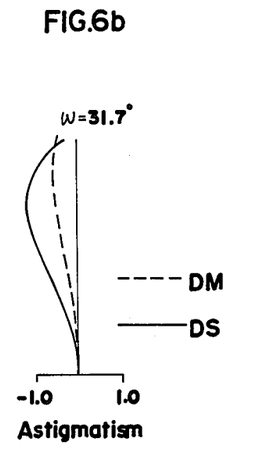
Figure 6C:
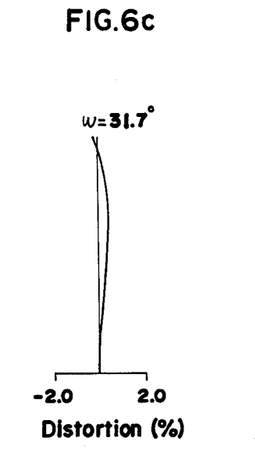
Figure 7A:
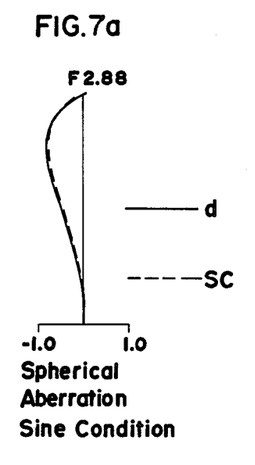
FIGS. 7a to 7c represent the aberration curves of the sixth embodiment.
Figure 7B:
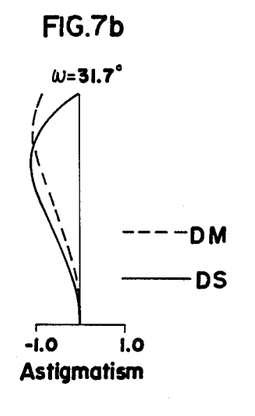
Figure 7C:
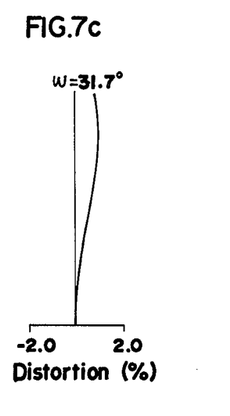
Figure 8A:
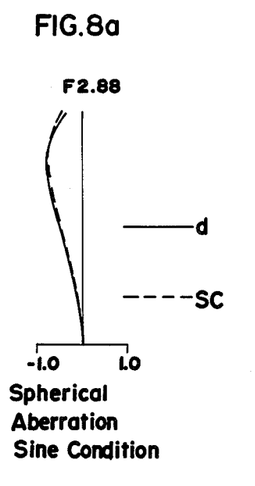
FIGS. 8a to 8c represent the aberration curves of the seventh embodiment.
Figure 8B:
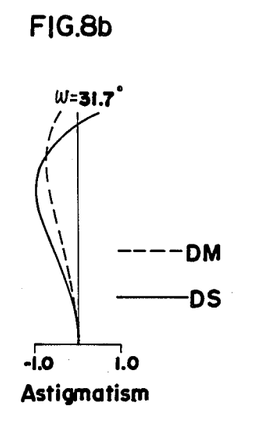
Figure 8C:
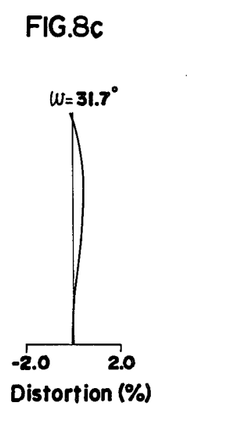
Figure 9A:
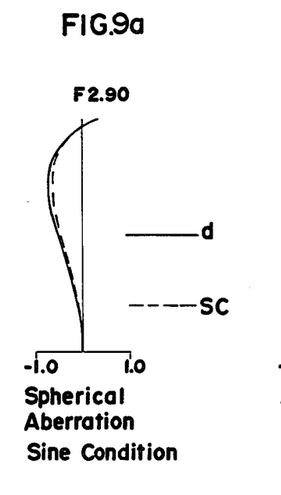
FIGS. 9a to 9c represent the aberration curves of the eighth embodiment.
Figure 9B:
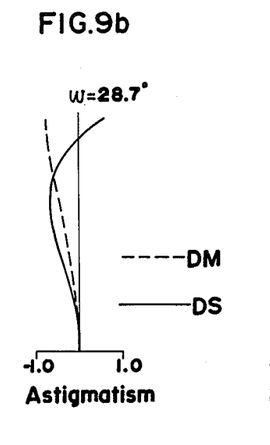
Figure 9C:
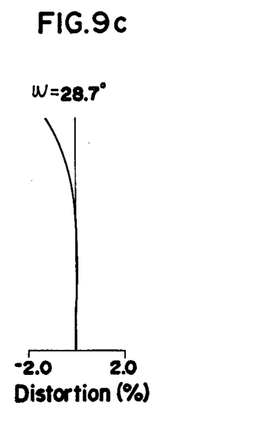
Figure 10A:
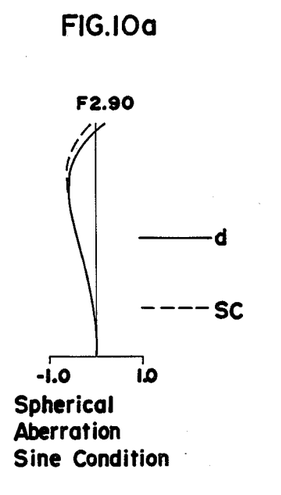
FIGS. 10a to 10c represent the aberration curves of the ninth embodiment.
Figure 10B:
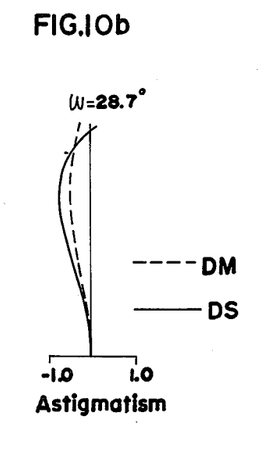
Figure 10C:
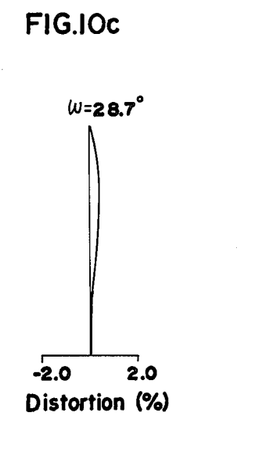
Figure 11A:
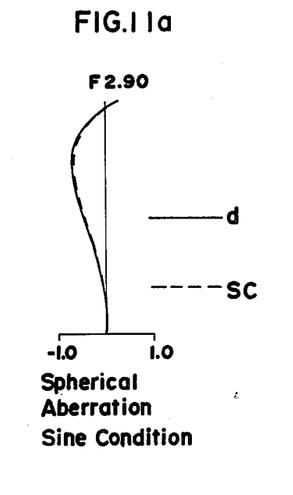
FIGS. 11a to 11c represent the aberration curves of the tenth embodiment.
Figure 11B:
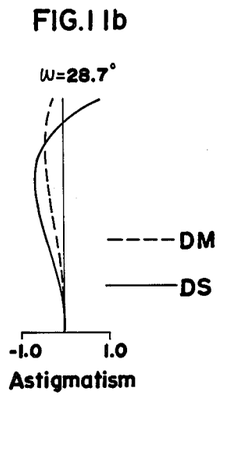
Figure 11C:
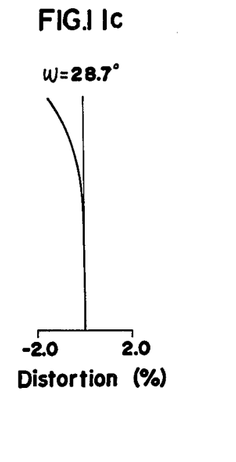
Figure 12A:
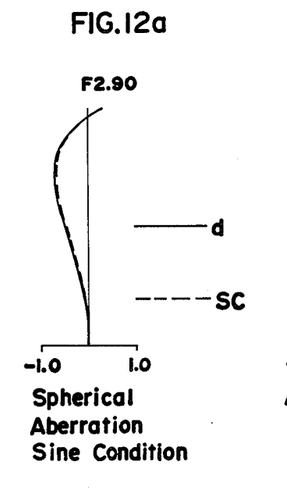
FIGS. 12a to 12c represent the aberration curves of the eleventh embodiment.
Figure 12B:
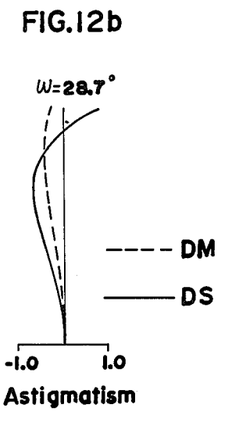
Figure 12C:
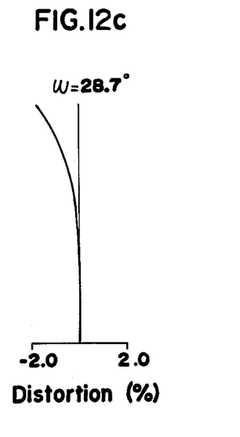

As disclosed in FIG. 1, the present invention provides a photographic lens system comprising from the object side to the image side: a first lens element ($L_1$) of a positive meniscus lens convex to the object side; a second lens element ($L_2$) of a bi-concave lens; a third lens element ($L_3$) of a bi-convex lens; a fourth lens element ($L_4$) of a negative meniscus lens concave to the object side; and an aperture diaphragm (S); wherein the lens system fulfills the following conditions:

$$0.4 < -f_4/f < 0.9 \quad (1)$$

$$0.004 < d_6/(D+t) < 0.1 \quad (2)$$

$$-1.0 < (r_7 - r_8)/(r_7 - r_8) < -0.35 \quad (3)$$

wherein: $f_4$ represents focal length of an air lens formed by the image side surface of the first lens element ($L_1$) and the object side surface of the second lens element ($L_2$); f represents focal length of the whole lens system; $d_6$ represents axial distance between the image side surface of the third lens element ($L_3$) and the object side surface of the fourth lens element ($L_4$); D represents axial distance from the object side surface of the first lens element ($L_1$) to the image side surface of the fourth lens element ($L_4$); t represents axial distance from the image side surface of the fourth lens element ($L_4$) to the aperture diaphragm (S) in the infinity focusing condition, measured towards the image side; $r_7$ represents paraxial radius of curvature of the object side surface of the fourth lens element ($L_4$); and $r_8$ represents paraxial radius of curvature of the image side surface of the fourth lens element ($L_4$).

According to the present invention, the refractive power arrangement favorable for correcting the distortion is applied in the lens system of behind aperture diaphragm type with good correction of the field curvature and the coma aberration while keeping a good balance therebetween. Furthermore, in the present invention, the spherical aberration, which is liable to be deteriorated with the increasing aperture ratio reaching F/2.60-2.90, is also well corrected for while maintaining sufficient quantity of light at the periphery of the image.

Condition (1) limits the focal length of the air lens formed by the image side surface of the first lens element ($L_1$) and the object side surface of the second lens element ($L_2$). It becomes possible to correct well the spherical aberration, the field curvature, and the coma aberration by controlling the focal length of the air lens within a proper range. If the lower limit of the condition (1) is violated, the spherical aberration becomes an over-correcting condition in both of the saggital plane and the tangential plane, and it becomes difficult to correct the positive coma aberration. On the other hand, if the upper limit of the condition (1) is violated, the spherical aberration becomes an under-correcting condition, the astigmatic difference increases, and it becomes also difficult to correct the chromatic aberration well.

Condition (2) limits the ratio of the axial distance between the third lens element ($L_3$) and the fourth lens element ($L_4$) to the axial thickness of the whole lens system including the aperture diaphragm (S), and is effective for maintaining the sufficient quantity of light at the periphery of the image. If the upper limit of the condition (2) is violated, the axial distance between the third lens element ($L_3$) and the fourth lens element ($L_4$) is enlarged, resulting in the undesirable decrease of the quantity of light at the periphery of the image. The undesirable decrease of the quantity of light at the periphery of the image can be compensated for by increasing the diameter of the front lens group having a positive refractive power, which would however contradict the object of the present invention of improving the compactness. On the other hand, if the lower limit of the condition (2) is violated, the mechanical interference of the third lens element ($L_3$) and the fourth lens element ($L_4$) comes into question, though it become easy to maintain the sufficient quantity of light at the periphery of the image. Additionally, the strong positive coma aberration occurs at the periphery of the image.

The present invention is characterized by the fourth lens element ($L_4$) of a negative meniscus lens convex to the image side. Condition (3) represents the shape of the fourth lens element ($L_4$). If the upper limit of the condition (3) is violated, the spherical aberration becomes an under-correcting condition, and it becomes difficult to correct the negative coma aberration. On the other hand, if the lower limit of the condition (3) is violated, the spherical aberration becomes an over-correcting condition, and it becomes difficult to correct the positive coma aberration.

Here, it is desirable to fulfill the following condition in stead of the condition (2), for further correcting the off-axial aberrations, such as the coma aberration, while maintaining the sufficient quantity of light at the periphery of the image and while maintaining the compactness of the lens system.

$$0.006 < d_6(D+t) < 0.035 \quad (2)'$$

In the present invention, it is further desirable to fulfill the following condition in addition to the above conditions (1) to (3):

$$0 < -f/r_8 < 1.10 \quad (4)$$

$$1.3 < -f_4/f < 9.0 \quad (5)$$

$$1.41 < N_4 < 1.58 \quad (6)$$

wherein: $f_4$ represents focal length of the fourth lens element ($L_4$); and $N_4$ represents refractive index of the fourth lens element ($L_4$).

According to the present invention, it is possible to make the fourth lens element ($L_4$) of a synethetic resin material by satisfying the condition (4). It is suitable for manufacturing the aspheric lens. In the lens system of the present invention, the fourth lens element ($L_4$) must be made of a material having a relatively low refractive index. Additionally, the fourth lens element ($L_4$) has a meniscus shape in which the difference between the radii of curvature of both surfaces is considerably small. Therefore, it is proper to make the fourth lens element ($L_4$) of a synthetic resin material having a relatively low refractive index and easy to manufacture a complex shape. On the other hand, the change of the refractive index of the synthetic resin material due to the change in temperature is considerably large. Thus, the change of back focal length of the lens system due to the change in temperature comes into question. The condition (4) is provided for controlling the change of back focal length of the lens system due to the change in temperature within a permissible range. If the lower limit of the condition (4) is violated, the change of back focal length of the lens system due to the change in temperature becomes undesirably large. Contrary, if the upper limit of the condition (4) is violated, it becomes difficult to correct the coma aberration well, though the change of back focal length of the lens system due to the change in temperature is well controlled.

If the lower limit of the condition (5) is violated, the spherical aberration becomes an under-correcting condition. Additionally, the distance between the image side surface of the fourth lens element ($L_4$) and the aperture diaphragm (S) becomes undesirably long, since the image side surface of the fourth lens element ($L_4$) should be concave to the image side. Thus, it becomes difficult to keep sufficient quantity of light at the periphery of the image. On the other hand, if the upper limit of the condition (5) is violated, the spherical aberration becomes an over-correcting, and it becomes difficult to correct the positive coma aberration generated at the periphery of the image.

Condition (6) limits the refractive index of the fourth lens element ($L_4$). The lower limit of the condition (6) is determined in accordance with the lowest refractive index of the practical material applied to the fourth lens element ($L_4$). On the other hand, if the upper limit of the condition (6) is violated, the Petzval sum becomes undesirably large, and therefore, it becomes difficult to correct the field curvature in the range extending from the middle of the image and the periphery thereof and the astigmatism while keeping a good balance.

In the present invention, it is desirable to apply at least one aspheric surface to the fourth lens element ($L_4$) for obtaining a lens system having a large aperture with good correction of the spherical aberration without increasing the number of the lens elements. Especially, if it is desired to further correct both of the spherical aberration and the coma aberration while keeping the good field curvature, an aspheric surface should be applied to the fourth lens element ($L_4$) in which the negative refractive power becomes strong in proportion to the increase of the height measured from the optical axis of the lens system, in the range from the half of the effective diameter of the fourth lens element ($L_4$) to the whole thereof. The reason of determining the range is that the effect of applying the aspheric surface on in correction of the aberrations in the off-axial region and the spherical aberration in the range while keeping a good balance is remarkable in the relatively large height. Such shape of the aspheric surface is limited by condition (7) shown below:

$$t(h) > r_7[1-\{1-(h/r_7)^2\}^{\frac{1}{2}}] - r_8[1-\{1-(h/r_8)^2\}^{\frac{1}{2}}] + d_7 \qquad (7)$$

wherein: $t(h)$ represents thickness of the fourth lens element ($L_4$) at height h; h represents height measured from the optical axis of the lens system, wherein $0.5R < h < R$; R represents minimum value among $r_7$, $r_8$, and effective diameter of the fourth lens element ($L_4$); and $d_7$ represents axial thickness of the fourth lens element ($L_4$).

If the condition (7) is violated, it becomes difficult to correct well the spherical aberration and the coma aberration in the lens system having the large aperture reaching F/2.60-2.90.

On the other hand, if it is desired to make the lens system more compact with good correction of the distortion, an aspheric surface should be applied to the fourth lens element ($L_4$) in which the negative refractive power becomes weak in proportion to the increase of the height measured from the optical axis of the lens system, in the range from the half of the effective diameter of the fourth lens element ($L_4$) to the whole thereof. Such shape of the aspheric surface is limited by condition (8) shown below:

$$t(h) < r_7[1-\{1-(h/r_7)^2\}^{\frac{1}{2}}] - r_8[1-\{1-(h/r_8)^2\}^{\frac{1}{2}}] + d_7 \qquad (8)$$

If the condition (8) is violated, it becomes difficult to correct the distortion well while making the lens system more compact.

Additionally, in the present invention, it is desirable to fulfill the following condition:

$$0.02 < d_4/f < 0.13 \qquad (9)$$

wherein: $d_4$ represents axial distance between the second lens element ($L_2$) and the third lens element ($L_3$).

Condition (9) is effective for maintaining the sufficient quantity of light at the periphery of the image with good correction of the off-axial aberrations, simlar to the condition (2). If the upper limit of the condition (9) is violated, the axial distance between the second lens element ($L_2$) and the third lens element ($L_3$) is enlarged, resulting in the undesirable decrease of the quantity of light at the periphery of the image. The undesirable decrease of the quantity of light at the periphery of the image can be compensated for by increasing the diameter of the front lens group having a positive refractive power, which however contradicts the object of the present invention of improving the compactness. On the other hand, if the lower limit of the condition (9) is violated, the mechanical interference of the second lens element ($L_2$) and the third lens element ($L_3$) comes into question, though it becomes easy to maintain the sufficient quantity of light at the periphery of the image. Additionally, the spherical aberration becomes an over-correcting condition and the negative coma aberration is generated in the middle of the image.

The following Tables 1 to 11 disclose, respectively, the first through eleventh embodiments of the present invention. In the Tables, f equals to the focal length, 2N equals the field angle, $F_{NO}$ equals the F-number, r is the radius of curvature with the respective sub number indicating the surfaces from the object to image side along the optical axis, d represents the axial distance and includes both air spaces and the actual thickness of the lens elements along the optical axis, Nd equals the refractive index and again, the sub numbers refer to the particular optical element from the object to the image side, and finally, $\nu d$ equals the Abbe number and the sub numbers refer to the specific lens elements from the object to the image side. The asterisk (*) represents the aspheric surface, and its coefficients are shown at the respective Tables.

Here, the aspheric coefficients A, B, - - - are defined by the following equation:

$$X = Y^2/[r_i + r_i\{1-(Y/r_i)^2\}^{\frac{1}{2}}] + AY^2 + BY^4 + CY^6 + \cdots$$

wherein $r_i$ represents the paraxial radius of curvature of the basic spherical surface, X represents the coordinate along the optical surface measured from the top of the basic surface, and Y represents the coordinate perpendicular to the optical axis measured from the optical axis. In the Tables, d(h) represents the difference between the thickness of the aspheric surface and the paraxial radius of curvature of the surface, and is represented as follows:

$$d(h) = t(h) - [r_7[1 - \{1 - (h/r_7)^2\}^{\frac{1}{2}}] - r_8[1 - \{1 - (h/r_8)^2\}^{\frac{1}{2}}] + d_7[$$

TABLE 1

Embodiment 1

$f = 100$   $F_{NO} = 2.60$   $2\omega = 63.4°$

| | Radius of Curvature | | Axial Distance | Refractive Index (Nd) | | Abbe Number (νd) |
|---|---|---|---|---|---|---|
| L₁ | $r_1$ 32.797 | | | | | |
| | | $d_1$ | 12.50 | $Nd_1$ 1.69680 | $\nu d_1$ | 56.47 |
| | $r_2$ 73.428 | | | | | |
| | | $d_2$ | 4.17 | | | |
| L₂ | $r_3$ −98.118 | | | | | |
| | | $d_3$ | 2.78 | $Nd_2$ 1.63980 | $\nu d_2$ | 34.55 |
| | $r_4$ 30.798 | | | | | |
| | | $d_4$ | 3.33 | | | |
| L₃ | $r_5$ 58.221 | | | | | |
| | | $d_5$ | 9.72 | $Nd_3$ 1.75450 | $\nu d_3$ | 51.57 |
| | $r_6$ −54.010 | | | | | |
| | | $d_6$ | 0.69 | | | |
| L₄ | $r_7^*$ −93.422 | | | | | |
| | | $d_7$ | 4.44 | $Nd_4$ 1.49140 | $\nu d_4$ | 57.82 |
| | $r_8$ −530.957 | | | | | |
| | | $t$ | 3.33 | | | |
| S | ∞ | | | | | |

Aspheric coefficients ($r_7$):

$A = 0.0$   $B = -0.72853 \times 10^{-6}$   $C = 0.68589 \times 10^{-9}$
$D = 0.94980 \times 10^{-11}$   $E = 0.85281 \times 10^{-16}$   $F = 0.51265 \times 10^{-21}$
$-f_A/f = 0.617$   $d_6/(D + t) = 0.017$   $(r_7 - r_8)/(r_7 + r_8) = -0.701$
$-f/r_8 = 0.188$   $-f_4/f = 2.31$   $N_4 = 1.4914$   $d_4/f = 0.033$
$0 < h < 15.2$

| h | d(h) |
|---|---|
| 0 | 0.0 |
| 4.0 | 0.0002 |
| 8.0 | 0.0026 |
| 12.0 | 0.0090 |
| 15.2 | 0.0033 |

TABLE 2

Embodiment 2

$f = 100$   $F_{NO} = 2.60$   $2\omega = 63.4°$

| | Radius of Curvature | | Axial Distance | Refractive Index (Nd) | | Abbe Number (νd) |
|---|---|---|---|---|---|---|
| L₁ | $r_1$ 34.922 | | | | | |
| | | $d_1$ | 13.06 | $Nd_1$ 1.69680 | $\nu d_1$ | 56.47 |
| | $r_2$ 82.000 | | | | | |
| | | $d_2$ | 4.72 | | | |
| L₂ | $r_3$ −105.556 | | | | | |
| | | $d_3$ | 2.78 | $Nd_2$ 1.59270 | $\nu d_2$ | 35.30 |
| | $r_4$ 31.673 | | | | | |
| | | $d_4$ | 4.44 | | | |
| L₃ | $r_5$ 58.700 | | | | | |
| | | $d_5$ | 11.39 | $Nd_3$ 1.75450 | $\nu d_3$ | 51.57 |
| | $r_6$ −52.749 | | | | | |
| | | $d_6$ | 0.69 | | | |
| L₄ | $r_7^*$ −70.918 | | | | | |
| | | $d_7$ | 4.44 | $Nd_4$ 1.49140 | $\nu d_4$ | 57.82 |
| | $r_8$ −5624.9 | | | | | |
| | | $t$ | 3.33 | | | |
| S | ∞ | | | | | |

Aspheric coefficients ($r_7$):

$A = 0.0$   $B = -0.13497 \times 10^{-5}$   $C = -0.13362 \times 10^{-9}$
$D = 0.45618 \times 10^{-11}$   $E = 0.10698 \times 10^{-16}$   $F = -0.12572 \times 10^{-21}$
$-f_A/f = 0.697$   $d_6/(D + t) = 0.015$   $(r_7 - r_8)/(r_7 + r_8) = -0.975$
$-f/r_8 = 0.018$   $-f_4/f = 1.46$   $N_4 = 1.4914$   $d_4/f = 0.044$
$0 < h < 15.1$

| h | d(h) |
|---|---|
| 0 | 0.0 |
| 4.0 | 0.0003 |
| 8.0 | 0.0055 |
| 12.0 | 0.0264 |
| 15.1 | 0.0592 |

TABLE 3

Embodiment 3

$f = 100$   $F_{NO} = 2.60$   $2\omega = 63.4°$

| | Radius of Curvature | | Axial Distance | Refractive Index (Nd) | | Abbe Number (νd) |
|---|---|---|---|---|---|---|
| L₁ | $r_1$ 33.829 | | | | | |
| | | $d_1$ | 11.94 | $Nd_1$ 1.69680 | $\nu d_1$ | 56.47 |
| | $r_2$ 86.389 | | | | | |
| | | $d_2$ | 3.89 | | | |
| L₂ | $r_3$ −108.333 | | | | | |
| | | $d_3$ | 2.78 | $Nd_2$ 1.59270 | $\nu d_2$ | 35.30 |
| | $r_4$ 30.729 | | | | | |
| | | $d_4$ | 4.72 | | | |
| L₃ | $r_5$ 65.637 | | | | | |
| | | $d_5$ | 10.56 | $Nd_3$ 1.75450 | $\nu d_3$ | 51.57 |
| | $r_6$ −51.518 | | | | | |
| | | $d_6$ | 0.28 | | | |
| L₄ | $r_7^*$ −74.805 | | | | | |
| | | $d_7$ | 4.44 | $Nd_4$ 1.49140 | $\nu d_4$ | 57.82 |
| | $r_8$ −5624.9 | | | | | |
| | | $t$ | 2.78 | | | |
| S | ∞ | | | | | |

Aspheric coefficients ($r_7$):

$A = 0.0$   $B = -0.96162 \times 10^{-6}$   $C = 0.26364 \times 10^{-9}$
$D = -0.49746 \times 10^{-11}$   $E = 0.14650 \times 10^{-16}$   $F = 0.98430 \times 10^{-22}$
$-f_A/f = 0.729$   $d_6/(D + t) = 0.007$   $(r_7 - r_8)/(r_7 + r_8) = -0.974$
$-f/r_8 = 0.018$   $-f_4/f = 1.54$   $N_4 = 1.4914$   $d_4/f = 0.047$
$0 < h < 15.1$

| h | d(h) |
|---|---|
| 0 | 0.0 |
| 4.0 | 0.0002 |
| 8.0 | 0.0038 |
| 12.0 | 0.0170 |
| 15.1 | 0.0334 |

TABLE 4

Embodiment 4

$f = 100$   $F_{NO} = 2.60$   $2\omega = 63.4°$

| | Radius of Curvature | | Axial Distance | Refractive Index (Nd) | | Abbe Number (νd) |
|---|---|---|---|---|---|---|
| L₁ | $r_1$ 33.558 | | | | | |
| | | $d_1$ | 12.78 | $Nd_1$ 1.69680 | $\nu d_1$ | 56.47 |
| | $r_2$ 71.424 | | | | | |
| | | $d_2$ | 4.72 | | | |
| L₂ | $r_3$ −98.302 | | | | | |
| | | $d_3$ | 3.06 | $Nd_2$ 1.63980 | $\nu d_2$ | 34.55 |
| | $r_4$ 31.390 | | | | | |
| | | $d_4$ | 3.06 | | | |
| L₃ | $r_5$ 56.506 | | | | | |
| | | $d_5$ | 10.28 | $Nd_3$ 1.75450 | $\nu d_3$ | 51.57 |
| | $r_6$ −56.261 | | | | | |
| | | $d_6$ | 0.56 | | | |
| L₄ | $r_7$ −97.492 | | | | | |
| | | $d_7$ | 4.44 | $Nd_4$ 1.49140 | $\nu d_4$ | 57.82 |
| | $r_8^*$ −345.64 | | | | | |
| | | $t$ | 3.33 | | | |
| S | ∞ | | | | | |

Aspheric coefficients ($r_8$):

$A = 0.0$   $B = 0.10744 \times 10^{-5}$   $C = -0.36779 \times 10^{-8}$
$D = -0.30338 \times 10^{-11}$   $E = -0.29413 \times 10^{-16}$   $F = -0.18424 \times 10^{-21}$
$-f_A/f = 0.604$   $d_6/(D + t) = 0.013$   $(r_7 - r_8)/(r_7 + r_8) = -0.560$
$-f/r_8 = 0.289$   $-f_4/f = 2.78$   $N_4 = 1.4914$   $d_4/f = 0.031$
$0 < h < 15.1$

TABLE 4-continued

Embodiment 4

| h | d (h) |
|---|---|
| 0 | 0.0 |
| 4.0 | 0.0003 |
| 8.0 | 0.0034 |
| 12.0 | 0.0100 |
| 15.1 | 0.0040 |

TABLE 5

Embodiment 5

$f = 100$   $F_{NO} = 2.60$   $2\omega = 63.4°$

| | | Radius of Curvature | | Axial Distance | | Refractive Index (Nd) | | Abbe Number ($\nu$d) |
|---|---|---|---|---|---|---|---|---|
| $L_1$ | $r_1$ | 32.720 | $d_1$ | 12.22 | $Nd_1$ | 1.69680 | $\nu d_1$ | 56.47 |
| | $r_2$ | 58.333 | $d_2$ | 5.56 | | | | |
| $L_2$ | $r_3$ | −96.360 | $d_3$ | 3.06 | $Nd_2$ | 1.63980 | $\nu d_2$ | 34.55 |
| | $r_4$ | 30.380 | $d_4$ | 2.08 | | | | |
| $L_3$ | $r_5$ | 47.101 | $d_5$ | 10.33 | $Nd_3$ | 1.75450 | $\nu d_3$ | 51.57 |
| | $r_6$ | −59.572 | $d_6$ | 0.28 | | | | |
| $L_4$ | $r_7$ | −102.247 | $d_7$ | 3.89 | $Nd_4$ | 1.49140 | $\nu d_4$ | 57.82 |
| | $r_8$* | −258.33 | t | 3.89 | | | | |
| | S | ∞ | | | | | | |

Aspheric coefficients ($r_8$):

$A = 0.0$   $B = 0.11788 \times 10^{-5}$   $C = -0.27088 \times 10^{-8}$ $D = -0.96487 \times 10^{-11}$ $-f_A/f = 0.526$   $d_6/(D + t) = 0.007$   $(r_7 - r_8)/(r_7 + r_8) = -0.433$ $-f/r_8 = 0.387$   $-f_4/f = 3.47$   $N_4 = 1.4914$   $d_4/f = 0.021$ $0 < h < 15.1$

| h | d (h) |
|---|---|
| 0 | 0.0 |
| 4.0 | 0.0003 |
| 8.0 | 0.0040 |
| 12.0 | 0.0122 |
| 15.1 | 0.0050 |

TABLE 6

Embodiment 6

$f = 100$   $F_{NO} = 2.88$   $2\omega = 63.4°$

| | | Radius of Curvature | | Axial Distance | | Refractive Index (Nd) | | Abbe Number ($\nu$d) |
|---|---|---|---|---|---|---|---|---|
| $L_1$ | $r_1$ | 30.643 | $d_1$ | 10.571 | $Nd_1$ | 1.69100 | $\nu d_1$ | 54.75 |
| | $r_2$ | 73.126 | $d_2$ | 4.571 | | | | |
| $L_2$ | $r_3$ | −116.384 | $d_3$ | 3.429 | $Nd_2$ | 1.70055 | $\nu d_2$ | 30.11 |
| | $r_4$ | 29.184 | $d_4$ | 2.857 | | | | |
| $L_3$ | $r_5$ | 57.538 | $d_5$ | 9.143 | $Nd_3$ | 1.80500 | $\nu d_3$ | 40.97 |
| | $r_6$ | −57.538 | $d_6$ | 0.571 | | | | |
| $L_4$ | $r_7$ | −108.050 | $d_7$ | 3.714 | $Nd_4$ | 1.49140 | $\nu d_4$ | 57.82 |
| | $r_8$* | −1428.571 | t | 3.714 | | | | |
| | S | ∞ | | | | | | |

Aspheric coefficients ($r_8$):

$A = 0.0$   $B = -0.16233 \times 10^{-7}$   $C = -0.35475 \times 10^{-8}$ $D = -0.84636 \times 10^{-11}$   $E = 0.58390 \times 10^{-16}$ $-f_A/f = 0.640$   $d_6/(D + t) = 0.015$   $(r_7 - r_8)/(r_7 + r_8) = -0.859$ $-f/r_8 = 0.070$   $-f_4/f = 2.38$   $N_4 = 1.4914$   $d_4/f = 0.029$ $0 < h < 13.4$

| h | d (h) |
|---|---|
| 0 | 0.0 |
| 4.0 | −0.0001 |
| 8.0 | −0.0011 |
| 12.0 | −0.0146 |
| 13.4 | −0.0298 |

TABLE 7

Embodiment 7

$f = 100$   $F_{NO} = 2.88$   $2\omega = 63.4°$

| | | Radius of Curvature | | Axial Distance | | Refractive Index (Nd) | | Abbe Number ($\nu$d) |
|---|---|---|---|---|---|---|---|---|
| $L_1$ | $r_1$ | 31.768 | $d_1$ | 12.14 | $Nd_1$ | 1.72000 | $\nu d_1$ | 50.31 |
| | $r_2$ | 65.720 | $d_2$ | 4.29 | | | | |
| $L_2$ | $r_3$ | −110.908 | $d_3$ | 3.43 | $Nd_2$ | 1.70055 | $\nu d_2$ | 30.11 |
| | $r_4$ | 28.798 | $d_4$ | 2.43 | | | | |
| $L_3$ | $r_5$ | 52.331 | $d_5$ | 10.29 | $Nd_3$ | 1.78100 | $\nu d_3$ | 44.55 |
| | $r_6$ | −52.331 | $d_6$ | 0.57 | | | | |
| $L_4$ | $r_7$ | −71.470 | $d_7$ | 0.71 | $Nd_4$ | 1.49140 | $\nu d_4$ | 57.82 |
| | $r_8$* | −186.805 | t | 3.71 | | | | |
| | S | ∞ | | | | | | |

Aspheric coefficients ($r_8$):

$A = 0.0$   $B = -0.77348 \times 10^{-6}$   $C = -0.89582 \times 10^{-9}$ $D = -0.23860 \times 10^{-10}$ $-f_A/f = 0.570$   $d_6/(D + t) = 0.014$   $(r_7 - r_8)/(r_7 + r_8) = -0.447$ $-f/r_8 = 0.535$   $-f_4/f = 2.38$   $N_4 = 1.4914$   $d_4/f = 0.024$ $0 < h < 13.4$

| h | d (h) |
|---|---|
| 0 | 0.0 |
| 4.0 | −0.0002 |
| 8.0 | −0.0038 |
| 12.0 | −0.0549 |
| 13.4 | −0.0549 |

TABLE 8

Embodiment 8

$f = 100$   $F_{NO} = 2.90$   $2\omega = 57.4°$

| | | Radius of Curvature | | Axial Distance | | Refractive Index (Nd) | | Abbe Number ($\nu$d) |
|---|---|---|---|---|---|---|---|---|
| $L_1$ | $r_1$ | 34.050 | $d_1$ | 13.92 | $Nd_1$ | 1.72000 | $\nu d_1$ | 50.31 |
| | $r_2$ | 80.209 | $d_2$ | 3.83 | | | | |
| $L_2$ | $r_3$ | −98.421 | $d_3$ | 3.34 | $Nd_2$ | 1.68300 | $\nu d_2$ | 31.52 |
| | $r_4$ | 32.028 | $d_4$ | 4.30 | | | | |
| $L_3$ | $r_5$ | 65.360 | $d_5$ | 8.10 | $Nd_3$ | 1.77250 | $\nu d_3$ | 49.77 |
| | $r_6$ | −51.448 | $d_6$ | 0.38 | | | | |
| $L_4$ | $r_7$ | −73.288 | $d_7$ | 3.06 | $Nd_4$ | 1.49140 | $\nu d_4$ | 57.82 |
| | $r_8$ | −194.781 | t | 3.29 | | | | |
| | S | ∞ | | | | | | |

$-f_A/f = 0.620$   $d_6/(D + t) = 0.0094$   $(r_7 - r_8)/(r_7 + r_8) = -0.45$

TABLE 8-continued

Embodiment 8

$-f/r_8 = 0.513$  $-f_4/f = 2.41$  $N_4 = 1.4914$  $d_4/f = 0.043$

TABLE 9

Embodiment 9

$f = 100$  $F_{NO} = 2.90$  $2\omega = 57.4°$

| | | Radius of Curvature | | Axial Distance | | Refractive Index (Nd) | | Abbe Number (νd) |
|---|---|---|---|---|---|---|---|---|
| $L_1$ | $r_1$ | 34.924 | | | | | | |
| | | | $d_1$ | 12.15 | $Nd_1$ | 1.78831 | $\nu d_1$ | 47.32 |
| | $r_2$ | 84.246 | | | | | | |
| | | | $d_2$ | 3.17 | | | | |
| | $r_3$ | −117.253 | | | | | | |
| $L_2$ | | | $d_3$ | 3.29 | $Nd_2$ | 1.67339 | $\nu d_2$ | 29.25 |
| | $r_4$ | 34.308 | | | | | | |
| | | | $d_4$ | 4.28 | | | | |
| | $r_5$ | 91.960 | | | | | | |
| $L_3$ | | | $d_5$ | 8.10 | $Nd_3$ | 1.78831 | $\nu d_3$ | 47.32 |
| | $r_6$ | −51.279 | | | | | | |
| | | | $d_6$ | 0.46 | | | | |
| | $r_7$ | −56.543 | | | | | | |
| $L_4$ | | | $d_7$ | 3.04 | $Nd_4$ | 1.49140 | $\nu d_4$ | 57.82 |
| | $r_8$ | −126.582 | | | | | | |
| | | | $t$ | 3.29 | | | | |
| | S | ∞ | | | | | | |

$-f_4/f = 0.650$  $d_6/(D + t) = 0.012$  $(r_7 − r_8)/(r_7 + r_8) = −0.38$
$-f/r_8 = 0.79$  $-f_4/f = 2.11$  $N_4 = 1.4914$  $d_4/f = 0.043$

TABLE 10

Embodiment 10

$f = 100$  $F_{NO} = 2.90$  $2\omega = 57.4°$

| | | Radius of Curvature | | Axial Distance | | Refractive Index (Nd) | | Abbe Number (νd) |
|---|---|---|---|---|---|---|---|---|
| $L_1$ | $r_1$ | 34.782 | | | | | | |
| | | | $d_1$ | 13.42 | $Nd_1$ | 1.72000 | $\nu d_1$ | 50.31 |
| | $r_2$ | 87.342 | | | | | | |
| | | | $d_2$ | 4.79 | | | | |
| | $r_3$ | −95.977 | | | | | | |
| $L_2$ | | | $d_3$ | 3.32 | $Nd_2$ | 1.70055 | $\nu d_2$ | 30.11 |
| | $r_4$ | 32.919 | | | | | | |
| | | | $d_4$ | 4.51 | | | | |
| | $r_5$ | 68.484 | | | | | | |
| $L_3$ | | | $d_5$ | 8.10 | $Nd_3$ | 1.78831 | $\nu d_3$ | 47.32 |
| | $r_6$ | −51.101 | | | | | | |
| | | | $d_6$ | 0.38 | | | | |
| | $r_7$ | −73.309 | | | | | | |
| $L_4$ | | | $d_7$ | 3.06 | $Nd_4$ | 1.49140 | $\nu d_4$ | 57.82 |
| | $r_8$ | −194.906 | | | | | | |
| | | | $t$ | 3.29 | | | | |
| | S | ∞ | | | | | | |

$-f_4/f = 0.630$  $d_6/(D + t) = 0.0093$  $(r_7 − r_8)/(r_7 + r_8) = −0.45$
$-f/r_8 = 0.513$  $-f_4/f = 2.41$  $N_4 = 1.4914$  $d_4/f = 0.045$

TABLE 11

Embodiment 11

$f = 100$  $F_{NO} = 2.90$  $2\omega = 57.4°$

| | | Radius of Curvature | | Axial Distance | | Refractive Index (Nd) | | Abbe Number (νd) |
|---|---|---|---|---|---|---|---|---|
| $L_1$ | $r_1$ | 34.300 | | | | | | |
| | | | $d_1$ | 13.80 | $Nd_1$ | 1.72000 | $\nu d_1$ | 50.31 |
| | $r_2$ | 86.799 | | | | | | |
| | | | $d_2$ | 3.54 | | | | |
| | $r_3$ | −100.618 | | | | | | |
| $L_2$ | | | $d_3$ | 3.29 | $Nd_2$ | 1.68300 | $\nu d_2$ | 31.52 |
| | $r_4$ | 32.437 | | | | | | |
| | | | $d_4$ | 4.81 | | | | |
| | $r_5$ | 71.010 | | | | | | |
| $L_3$ | | | $d_5$ | 8.18 | $Nd_3$ | 1.77250 | $\nu d_3$ | 49.77 |
| | $r_6$ | −51.286 | | | | | | |

TABLE 11-continued

Embodiment 11

| | | | | $d_6$ | 0.38 | | | |
|---|---|---|---|---|---|---|---|---|
| | $r_7$ | −73.156 | | | | | | |
| $L_4$ | | | $d_7$ | 3.04 | $Nd_4$ | 1.49140 | $\nu d_4$ | 57.82 |
| | $r_8$ | −193.777 | | | | | | |
| | | | $t$ | 3.29 | | | | |
| | S | ∞ | | | | | | |

$-f_4/f = 0.650$  $d_6/(D + t) = 0.0094$  $(r_7 − r_8)/(r_7 + r_8) = −0.45$
$-f/r_8 = 0.516$  $-f_4/f = 2.41$  $N_4 = 1.4914$  $d_4/f = 0.048$

As can be readily appreciated, it is possible to deviate from the above embodiments of the present invention and, as will be readily understood by those skilled in the optical art, the invention is capable of many modifications and improvements within the scope and spirit thereof. Accordingly, it will be understood that the invention is not to be limited by these specific embodiments, but only by the scope and spirit of the appended claims.

What is claimed is:

1. A photographic lens system comprising from the object side to the image side;
   a first lens element of a positive meniscus lens convex to the object side;
   a second lens element of a bi-concave lens;
   a third lens element of a bi-convex lens;
   a fourth lens element of a negative meniscus lens concave to the object side; and
   an aperture diaphragm;
   wherein the lens system fulfills the following conditions:

$0.4 < -f_4/f < 0.9$ $0.004 < d_6/(D+t) < 0.1$ $-1.0 < (r_7 - r_8)/(r_7 + r_8) < -0.35$ wherein:
   $f_4$ represents focal length of an air lens formed by the image side surface of the first lens element and the object side surface of the second lens element;
   f represents focal length of the whole lens system;
   $d_6$ represents axial distance between the image side surface of the third lens element and the object side surface of the fourth lens element;
   D represents axial distance from the object side surface of the first lens element to the image side surface of the fourth lens element;
   t represents axial distance from the image side surface of the fourth lens element to the aperture diaphragm in the infinity focusing condition, measured towards the image side;
   $r_7$ represents paraxial radius of curvature of the object side surface of the fourth lens element; and
   $r_8$ represents paraxial radius of curvature of the image side surface of the fourth lens element.

2. A photographic lens system according to claim 1, wherein the lens system further fulfills the following condition:

$0.006 < d_6/(D+t) < 0.035$.

3. A photographic lens system according to claim 1, whereinthe lens system further fulfills the following conditions:

$0 < -f/r_8 < 1.10$ $1.3 < -f_4/f < 9.0$ $1.41 < N_4 < 1.58$ wherein:
$f_4$ represents focal length of the fourth lens element; and $N_4$ represents refractive index of the fourth lens element.

4. A photographic lens system according to claim 3, wherein the fourth lens element has at least an aspheric surface, and the lens system further fulfills the following condition:

$$t(h) > r_7[1-\{1-(h/r_7)^2\}^{\frac{1}{2}}] - r_8[1-\{1-(h/r_8)^2\}^{\frac{1}{2}}] + \frac{-}{d_7}$$

wherein:
t(h) represents thickness of the fourth lens element at height h;

h represents height measured from the optical axis of the lens system, wherein $0.5R < h < R$;

R represents minimum value among $r_7$, $r_8$, and effective diameter of the fourth lens element; and $d_7$ represents axial thickness of the fourth lens element.

5. A photographic lens system according to claim 3, wherein the fourth lens element has at least an aspheric surface, and the lens system further fulfills the following condition:

$$t(h) < r_7[1-\{1-(h/r_7)^2\}^{\frac{1}{2}}] - r_8[1-\{1-(h/r_8)^2\}^{\frac{1}{2}}] + \frac{-}{d_7}$$

wherein:
t(h) represents thickness of the fourth lens element at height h;

h represents height measured from the optical axis of the lens system, wherein $0.5R < h < R$;

R represents minimum value among $r_7$, $r_8$, and effective diameter of the fourth lens element; and $d_7$ represents axial thickness of the fourth lens element.

6. A photographic lens system according to claim 1, wherein the lens system further fulfills the following condition:

$0.02 < d_4/f < 0.13$ wherein:
$d_4$ represents axial distance between the second lens element and the third lens element.

7. A photographic lens system according to claim 1, wherein the lens system is represented by the following design parameters:

| | f = 100 $F_{NO}$ = 2.90 2ω = 57.4° | | | | | | |
|---|---|---|---|---|---|---|---|
| | Radius of Curvature | | Axial Distance | | Refractive Index (Nd) | | Abbe Number (νd) |
| $r_1$ | 34.300 | | | | | | |
| | | $d_1$ | 13.80 | $Nd_1$ | 1.72000 | $νd_1$ | 50.31 |
| $r_2$ | 86.799 | | | | | | |
| | | $d_2$ | 3.54 | | | | |
| $r_3$ | −100.618 | | | | | | |
| | | $d_3$ | 3.29 | $Nd_2$ | 1.68300 | $νd_2$ | 31.52 |
| $r_4$ | 32.437 | | | | | | |
| | | $d_4$ | 4.81 | | | | |

-continued

| | f = 100 $F_{NO}$ = 2.90 2ω = 57.4° | | | | | | |
|---|---|---|---|---|---|---|---|
| | Radius of Curvature | | Axial Distance | | Refractive Index (Nd) | | Abbe Number (νd) |
| $r_5$ | 71.010 | | | | | | |
| | | $d_5$ | 8.18 | $Nd_3$ | 1.77250 | $νd_3$ | 49.77 |
| $r_6$ | −51.286 | | | | | | |
| | | $d_6$ | 0.38 | | | | |
| $r_7$ | −73.156 | | | | | | |
| | | $d_7$ | 3.04 | $Nd_4$ | 1.49140 | $νd_4$ | 57.82 |
| $r_8$ | −193.777 | | | | | | |
| | | t | 3.29 | | | | |
| S | ∞ | | | | | | |

8. A photographic lens system comprising from the object side to the image side;
a first lens element of a positive meniscus lens convex to the object side;
a second lens element of a bi-concave lens;
a third lens element of a bi-convex lens;
a fourth lens element of a negative meniscus lens concave to the object side; and
an aperture diaphragm;
wherein the lens system fulfills the following conditions:

$0.004 < d_6/(D+t) < 0.1$ $0 < -f/r_8 < 1.10$ $1.3 < -f_4/f < 9.0$ $1.41 < N_4 < 1.58$ wherein:
$d_6$ represents axial distance between the image side surface of the third lens element and the object side surface of the fourth lens element;

D represents axial distance from the object side surface of the first lens element to the image side surface of the fourth lens element;

t represents axial distance from the image side surface of the fourth lens element to the aperture diaphragm in the infinity focusing condition, measured towards the image side;

f represents focal length of the whole lens system;

$r_8$ represents paraxial radius of curvature of the image side surface of the fourth lens element;

$f_4$ represents focal length of the fourth lens element; and $N_4$ represents refractive index of the fourth lens element.

9. A photographic lens system according to claim 8, wherein the lens system further fulfills the following condition:

$-1.0 < (r_7-r_8)/(r_7+r_8) < -0.35$ wherein:
$r_7$ represents paraxial radius of curvature of the object side surface of the fourth lens element; and $r_8$ represents paraxial radius of curvature of the image side surface of the fourth lens element.

10. A photographic lens system according to claim 9, wherein the lens system further fulfills the following condition:

$0.006 < d_6/(D+t) < 0.035$

11. A photographic lens system according to claim 10, wherein the fourth lens element has at least an aspheric surface, and the lens system further fulfills the following condition:

$$t(h) > r_7[1-\{1-(h/r_7)^2\}^{1/2}] - r_8[1-\{1-(h/r_8)^2\}^{1/2}] + d_7$$

wherein:
- $t(h)$ represents thickness of the fourth lens element at height h;
- h represents height measured from the optical axis of the lens system, wherein $0.5R < h < R$;
- R represents minimum value among $r_7$, $r_8$, and effective diameter of the fourth lens element; and
- $d_7$ represents axial thickness of the fourth lens element.

12. A photographic lens system according to claim 10, wherein the fourth lens element has at least an aspheric surface, and the lens system further fulfills the following condition:

$$t(h) < r_7[1-\{1-(h/r_7)^2\}^{1/2}] - r_8[1-\{1-(h/r_8)^2\}^{1/2}] + d_7$$

wherein:
- $t(h)$ represents thickness of the fourth lens element at height h;
- h represents height measured from the optical axis of the lens system, wherein $0.5R < h < R$;
- R represents minimum value among $r_7$, $r_8$, and effective diameter of the fourth lens element; and
- $d_7$ represents axial thickness of the fourth lens element.

13. A photographic lens system comprising from the object side to the image side;
- a first lens element of a positive meniscus lens convex to the object side;
- a second lens element of a bi-concave lens;
- a third lens element of a bi-convex lens;
- a fourth lens element of a negative meniscus lens concave to the object side; and
- an aperture diaphragm;

wherein the lens system fulfills the following conditions:

$$-1.0 < (r_7 - r_8)/(r_7 + r_8) < -0.35$$

$$0 < -f/r_8 < 1.10$$

$$1.3 < -f_4/f < 9.0$$

wherein:
- $r_7$ represents paraxial radius of curvature of the object side surface of the fourth lens element;
- $r_8$ represents paraxial radius of curvature of the image side surface of the fourth lens element;
- f represents focal length of the whole lens system; and
- $f_4$ represents focal length of the fourth lens element.

14. A photographic lens system according to claim 13, wherein the lens system further fulfills the following condition:

$$1.41 < N_4 < 1.58$$

wherein:
- $N_4$ represents refractive index of the fourth lens element.

15. A photographic lens system according to claim 14, wherein the lens system further fulfills the following condition:

$$0.006 < d_6/(D+t) < 0.035$$

wherein:
- $d_6$ represents axial distance between the image side surface of the third lens element and the object side surface of the fourth lens element;
- D represents axial distance from the object side surface of the first lens element to the image side surface of the fourth lens element; and
- t represents axial distance from the image side surface of the fourth lens element to the aperture diaphragm in the infinity focusing condition, measured towards the image side.

16. A photographic lens system according to claim 15, wherein the fourth lens element has at least an aspheric surface, and the lens system further fulfills the following condition:

$$t(h) > r_7[1-\{1-(h/r_7)^2\}^{1/2}] - r_8[1-\{1-(h/r_8)^2\}^{1/2}] + d_7$$

wherein:
- $t(h)$ represents thickness of the fourth lens element at height h;
- h represents height measured from the optical axis of the lens system, wherein $0.5R < h < R$;
- R represents minimum value among $r_7$, $r_8$, and effective diameter of the fourth lens element; and
- $d_7$ represents axial thickness of the fourth lens element.

17. A photographic lens system according to claim 15, wherein the fourth lens element has at least an aspheric surface, and the lens system further fulfills the following condition:

$$t(h) < r_7[1-\{1-(h/r_7)^2\}^{1/2}] - r_8[1-\{1-(h/r_8)^2\}^{1/2}] + d_7$$

wherein:
- $t(h)$ represents thickness of the fourth lens element at height h;
- h represents height measured from the optical axis of the lens system, wherein $0.5R < h < R$;
- R represents minimum value among $r_7$, $r_8$, and effective diameter of the fourth lens element; and
- $d_7$ represents axial thickness of the fourth lens element.

* * * * *